US005571269A

United States Patent [19]

Buelow

[11] Patent Number: 5,571,269

[45] Date of Patent: Nov. 5, 1996

[54] ROTARY SEAL ASSEMBLY FOR ROTARY DRUM

[76] Inventor: Karl Buelow, P.O. Box 997, Lake Junaluska, N.C. 28745

[21] Appl. No.: 417,804

[22] Filed: Apr. 6, 1995

[51] Int. Cl.$^{6}$ .............................. F16J 15/32; F27B 7/24

[52] U.S. Cl. .............................. 277/138; 277/152; 277/154; 277/174; 277/199; 432/115

[58] Field of Search .............................. 277/56, 97, 138, 277/152, 154, 174, 192, 199, 212 F; 432/115, 242; 34/242

[56] References Cited

U.S. PATENT DOCUMENTS

| | | | |
|---|---|---|---|
| 1,620,989 | 3/1927 | Agthe | 432/115 |
| 3,940,239 | 2/1976 | Rossi et al. | 432/115 |
| 4,050,702 | 9/1977 | Del Matto | 277/148 |
| 4,111,439 | 9/1978 | Schmidt | 432/115 |
| 4,338,080 | 7/1982 | Grandcolas et al. | 432/115 |
| 4,342,555 | 8/1982 | Bohanszky | 432/115 |
| 4,370,128 | 1/1983 | Chielens et al. | 432/115 |
| 4,405,137 | 9/1983 | Webb | 277/153 |
| 4,406,464 | 9/1983 | Schymura | 277/65 |
| 4,811,961 | 3/1989 | Williams | 277/199 |
| 4,836,560 | 6/1989 | Haberberger | 277/88 |
| 4,875,691 | 10/1989 | Kosi | 277/147 |
| 4,961,588 | 10/1990 | Brienza | 277/148 |
| 5,383,672 | 1/1995 | Cornelius | 277/152 |

FOREIGN PATENT DOCUMENTS

| | | | |
|---|---|---|---|
| 0630506 | 9/1978 | U.S.S.R. | 432/115 |
| 1151804 | 4/1985 | U.S.S.R. | 432/115 |
| 1232908 | 5/1986 | U.S.S.R. | 432/115 |
| 1408178 | 7/1988 | U.S.S.R. | 432/115 |
| 1515019 | 10/1989 | U.S.S.R. | 432/115 |
| 1571385 | 6/1990 | U.S.S.R. | 432/115 |

OTHER PUBLICATIONS

Webbco, Inc.–"WEBBCO Flex–Steel Kiln Seals" brochure, no date.

Webbco Engineering, Inc.—"The Webbco FLEX–STEEL Kiln Seal Installation Procedure", no date.

*Primary Examiner*—Thomas B. Will
*Assistant Examiner*—John L. Beres
*Attorney, Agent, or Firm*—Shefte, Pinckney & Sawyer

[57] ABSTRACT

An improved rotary seal assembly for kiln drums and the like utilizes a series of overlapping metal leaves mounted to a hood surrounding the drum and a wear ring resiliently supported to surround the drum at an annular spacing from its outer surface. Wear liners on the metal leaves are resiliently held by the leaves in surface contact with the outer surface of the wear ring to maintain a seal therebetween. Respective annular plates project radially outwardly from the drum and inwardly from the wear ring into overlapping abutment to seal the annular space between the wear ring and the drum.

11 Claims, 6 Drawing Sheets

ROTARY SEAL ASSEMBLY FOR ROTARY DRUM

BACKGROUND OF THE INVENTION

The present invention relates generally to air or gas sealing arrangements for rotary drums such as high-temperature rotary kilns and, more particularly, to a flexible seal for sealing the opening between a rotating drum and a stationary hood to prevent the ingress and egress of gaseous fluids at the ends of the rotary drum.

It is well known to provide a flexible seal at both ends of a rotary kiln to seal the annular space between the rotating cylinder of the kiln and the stationary housing at each end of the kiln. It is desirable to seal the spaces between the kiln ends and the hoods due to the high temperatures within kilns, which in the case of cement kilns are about 2750° F. to 3000° F. Sealing these spaces provides substantial benefits by confining toxic gases within the kiln and increasing energy efficiency through prevention of loss of the heated gas.

U.S. Pat. No. 4,405,137 describes a flexible rotary seal which uses discrete metal leaves formed from resilient sheet metal which are overlapped and secured to the hood at one end and have the other end secured to a wear liner. The metal leaves are bent and stressed so that the wear liner is biased into continuous engagement with the rotary kiln, and a cable assists in holding the wear liner against the rotary kiln.

While metal leaf rotary seals of the type in U.S. Pat. No. 4,405,137 have proven to efficiently seal rotary kilns, small gaps or spaces may develop between the overlapping metal leaves in operation, particularly if the wear liner wears unevenly. Uneven wear may result if the kiln rotates irregularly or if thermal expansion causes the kiln to develop an irregular shape. It should be noted that for large kilns of several hundred feet longitudinal thermal expansion may be around one foot.

In accordance with the present invention, a rotary seal assembly for rotary drums is provided which incorporates overlapping metal leaves but which provides a greatly reduced tendency to form small gaps or spaces between adjacent metal leaves as the drum rotates, thereby reducing energy consumption and harmful environmental effects.

SUMMARY OF THE INVENTION

Briefly summarized, the present invention provides a rotary seal assembly for sealing a large, high temperature rotary drum to a stationary hood wherein the drum has a substantially circular cylindrical surface near one of its open ends and the hood is open to the interior of the drum. Basically, the seal assembly of the present invention comprises a series of resilient overlapping metal leaves which completely encircle the cylindrical surface of the drum, with each leaf having a mounting end affixed to the stationary hood and a sealing end extending toward the cylindrical surface of the drum. Each leaf also has a sealing edge along one edge in its longitudinal extent, with each sealing edge being overlapped by an adjacent leaf, and each leaf also has an overlapping edge along its other longitudinal edge, with the overlapping edge overlapping the sealing edge of an adjacent leaf. A wear liner is secured to each leaf at the sealing end of the leaf. Support devices are fixed to the cylindrical surface of the drum and extend to support a wear ring which is mounted annularly about the cylindrical surface. The support devices have resilient means so that they may yield in response to radial movement of the cylindrical surface such as would occur in irregular rotation. The wear liner engages the wear ring to effect a sealing engagement therebetween. An inner annular plate is attached to the drum's cylindrical surface, and an outer annular plate is attached to the wear ring, with the inner and outer annular plates overlapping one another to seal the annular area between the cylindrical surface of the drum and the wear ring.

It is also advantageous if the wear liner has an inner surface for engagement with the wear ring and a slot is formed in the inner engagement surface axially relative to the axis of rotation of the drum, so as to permit thermal expansion of the inner engagement surface of the wear liner. The rotary seal assembly maintains the leaves under resilient flexure between their respective mounting and sealing ends so as to continuously urge the wear liners against the wear ring.

The rotary seal may include securing and spacing means for securing each metal leaf to the hood at the overlapping edge of the leaf, as well as for securing each said leaf to a wear liner and to the sealing edge of an adjacent metal leaf, so that each leaf is allowed to move circumferentially at its overlapping edge relative to the hood and to the wear liner. A longitudinal portion of the sealing edge of each metal leaf may define an arcuate recess for reducing the bending resistance of the metal leaf to bending flexure, while also allowing the metal leaf to maintain sealing engagement with the adjacent overlapping metal leaf.

The metal leaves are preferably generally rhombic and are disposed so that each metal leaf extends from its mounting end to its sealing end obliquely relative to an axial plane defined by the axis of rotation of the drum, with the sealing ends being displaced circumferentially relative to the mounting end. Each wear liner has an inner surface for engaging the wear ring, and the inner surface of the wear liner may be shaped to conform with the outer surface of the wear ring in sealing engagement.

The support device supporting the wear ring may be composed of a tubular element affixed to either the cylindrical surface of the drum or the wear ring, a guide pin affixed to either the cylindrical surface or the wear ring, the guide pin being received slidingly in the tubular element, and means for urging the guide pin and the tubular element away from each other. The wear ring may be a cylindrical ring. The inner annular plate may extend radially outward from the cylindrical surface of the drum, and the outer annular plate may extend inward from the wear ring, so that the inner annular plate and the outer annular plate are in parallel face abutting relation with one another.

DETAILED DESCRIPTION OF THE PREFERRED EMBODIMENT

Figure 1:
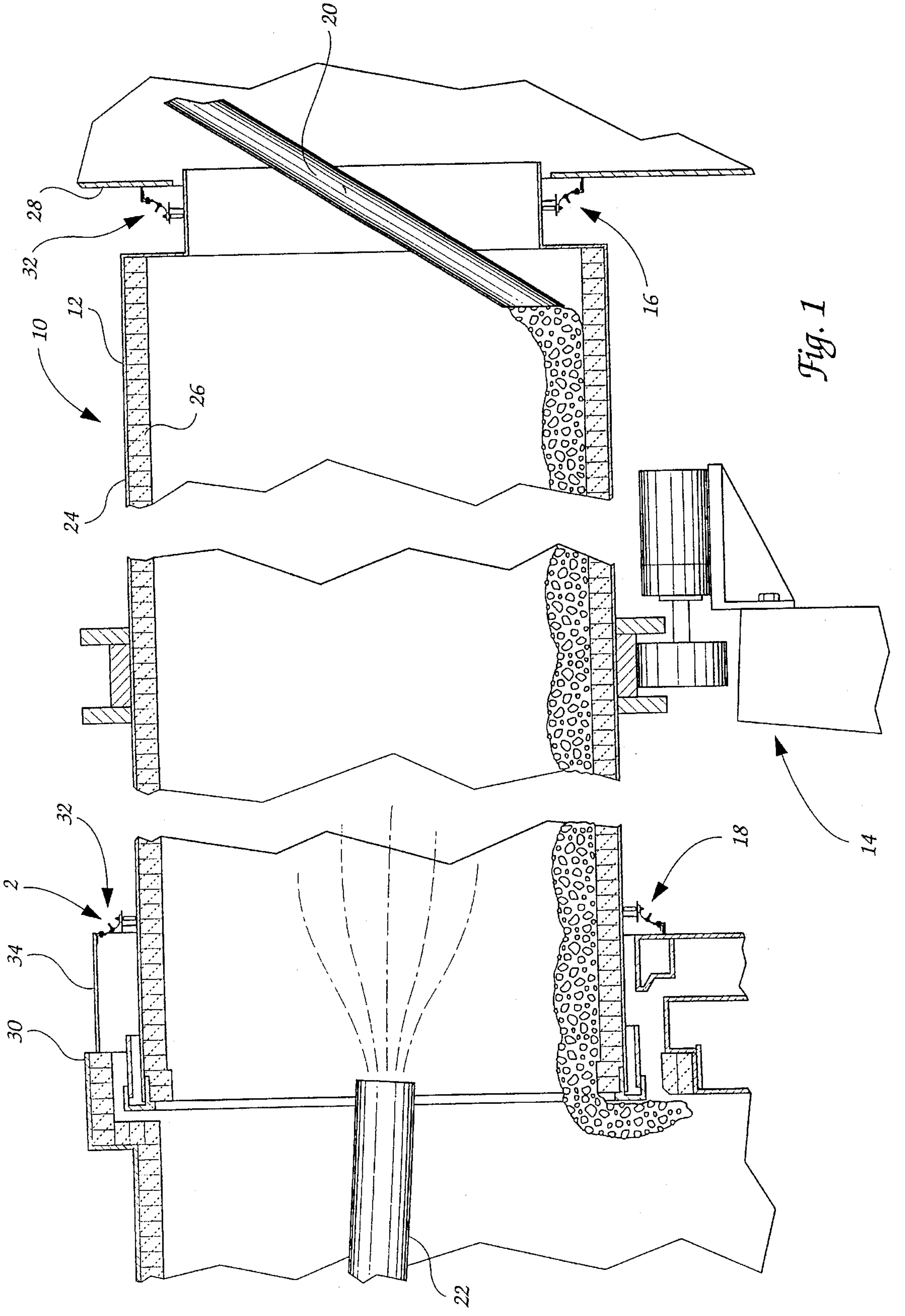
FIG. 1 is a longitudinal cross-sectional view of a typical rotary cement kiln in which the rotary seal assembly of the present invention is preferably embodied.

Referring now to the accompanying drawings and initially to FIG. 1, a typical rotary cement kiln of the type in which the rotary seal assembly of the present invention is particularly designed and adapted for use is depicted generally at 10 in FIG. 1 in a lengthwise cross-sectional view taken vertically through the diameter of the kiln. As is basically conventional, the kiln 10 essentially comprises a drum 12, typically of a relatively large diameter, rotatably mounted on and driven by driving support structures shown only representatively at 14. Typically, the kiln is operated as a countercurrent furnace with the drum 12 disposed about an inclined axis of rotation extending at a downward angle with respect to horizontal from an elevated feed end 16 to a lower discharge end 18 whereby raw materials (commonly limestone and other minerals) may be fed from appropriate hoppers (not shown) through a chute 20 into the feed end 16 and, as the drum 12 is rotated by means of the driving supports 14, the raw materials advance by gravity along the length of the drum 12 to the discharge end 18 at which a fuel-fired burner 22 disposed concentric to the rotational axis of the drum 12 serves to burn the raw materials at relatively high temperatures to produce Portland cement clinker which eventually falls gravitationally from the discharge end 18 of the drum 12.

As is also conventional, the kiln drum 12 typically is formed of a cylindrical shell 24, commonly made of steel or another suitable metal, lined with a refractory material 26 to protect the shell 24 from the high temperatures prevailing during the cement manufacturing process.

As also depicted in FIG. 1, each of the feed and discharge end 16,18 of the rotary drum 12 is surrounded by a respective hood 28,30 with an annular sealing assembly 32 in accordance with the present invention being disposed to substantially close and seal the annular space between the respective drum ends 16,18 and their associated hoods 28,30 for the two-fold purpose of minimizing heat loss so as to improve efficiency and economy in the manufacturing operation and to prevent escape of potentially harmful gases, dust and other byproducts of the process into the ambient environment.

Figure 2:
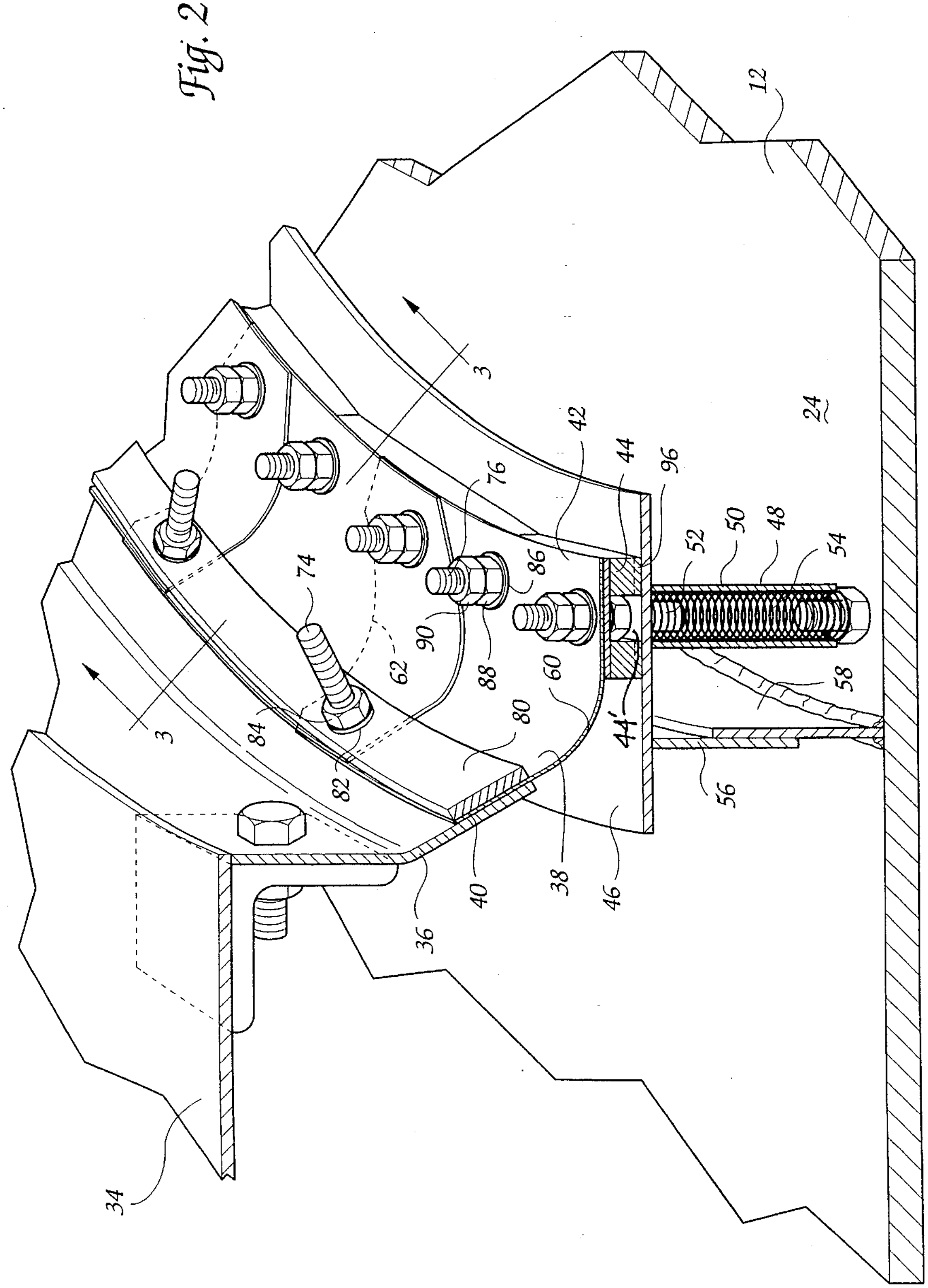
FIG. 2 is a perspective view of the rotary seal assembly of the present invention at the discharge end of the rotary kiln of FIG. 1, as viewed generally in the direction of arrow 2 therein.
Figure 3:
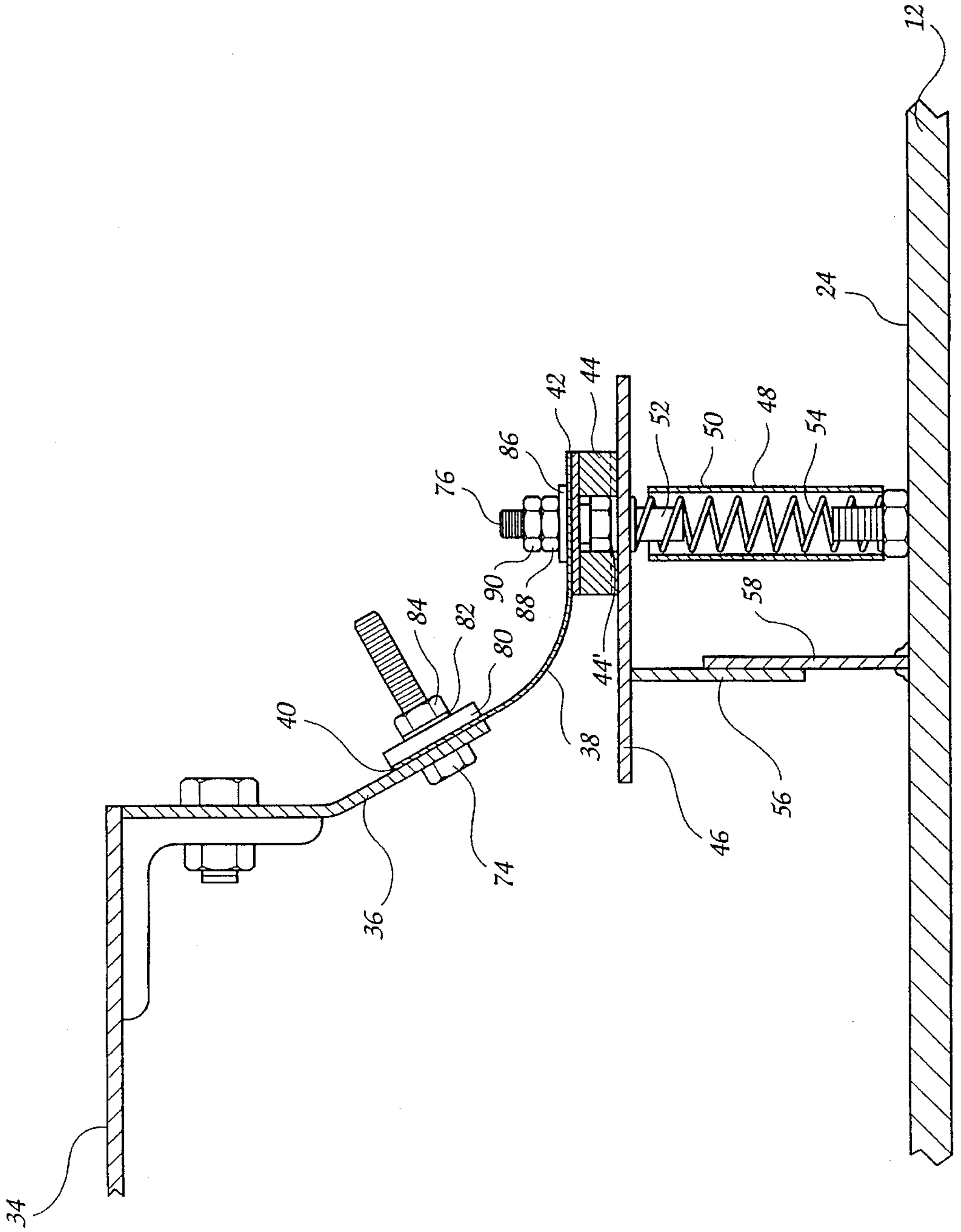
FIG. 3 is an enlarged cross-sectional view of the present rotary seal assembly at the discharge end of the rotary kiln of FIGS. 1 and 2, taken along line 3—3 of FIG. 2.
Figure 4:
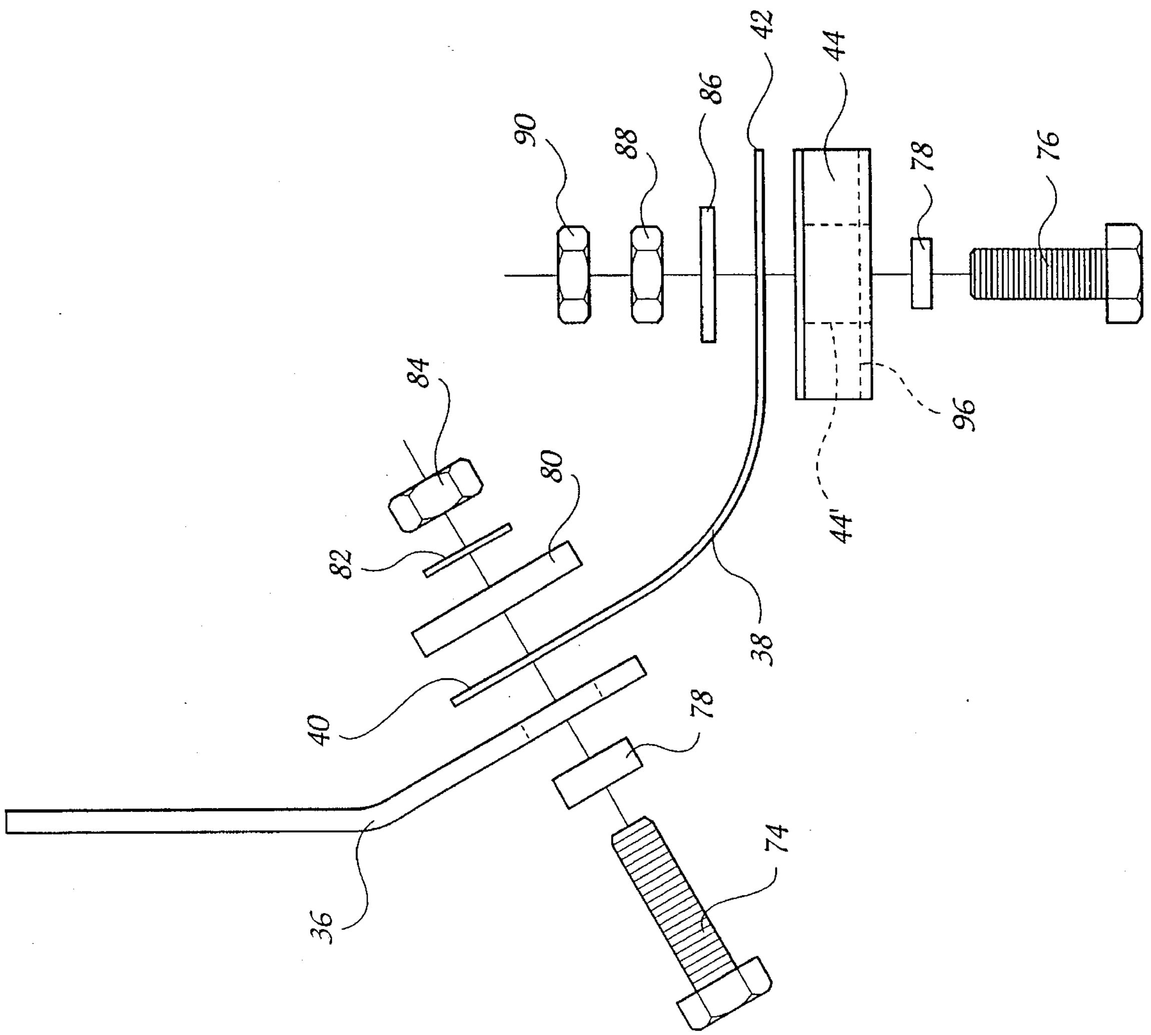
FIG. 4 is a cross-sectional view, similar to FIG. 3, but partially exploded to depict individual components thereof.

The annular sealing assembly 32 of the present invention is shown in greater detail in FIGS. 2–4, wherein the sealing assembly 32 surrounding the discharge end of the drum 12 is shown on a relatively enlarged scale from that of FIG. 1, it being understood that the sealing assembly 32 about the feed end 16 of the drum 12 is essentially identical in construction. At the drum's discharge end 18, a cylindrical extension 34 of the associated hood 30 extends concentrically about the drum 12 and supports a preferably conical annular mounting bracket 36 on which the seal assembly 32 is mounted. The sealing assembly 32 comprises a series of individual leaves 38 arranged in successively overlapping relation to one another annularly about the discharge end 18 of the drum 12 to encircle the drum 12. Each leaf 38 has a mounting end 40 at which the leaf 38 is affixed by conventional bolting to the annular mounting bracket 36, and the leaf 38 projects therefrom toward the outer cylindrical surface of the drum 12 to a sealing end 42 at which a wear liner 44 is affixed by bolting to the inward surface of the sealing end 42 facing the drum 12.

Immediately adjacent the collective annular extent of the sealing ends 42 of the multiple overlapping leaves 38 is a cylindrical wear ring 46 supported annularly about the drum 12 in essentially concentric coaxial relation thereto by a plurality of support devices 48 spaced circumferentially about the drum 12. Each support device 48 basically comprises a tubular body 50 affixed to extend radially outwardly from the drum 12 with the outward end of each tubular body 50 slidably receiving a guide pin or piston 52 affixed to and projecting radially inwardly from the wear ring 46. A spring 54 or other suitably resilient biasing device or element is disposed within each tubular body 50 to urge the respective guide pin 52 outwardly, whereby the support devices 48 collectively support the wear ring 46 concentrically to the drum 12 and in contact with the wear liners 44 on the sealing ends 42 of the leaves 38. To seal the annular space between the wear ring 46 and the drum 12, an annular plate 56 is affixed to and projects radially inwardly from the interior annular surface of the wear ring 46 and a similar annular plate 58 is affixed to and projects radially outwardly from the exterior surface of the drum shell 24 such that the respective plates 56,58 are disposed in parallel overlapping face-abutting relation with one another.

Figure 5:
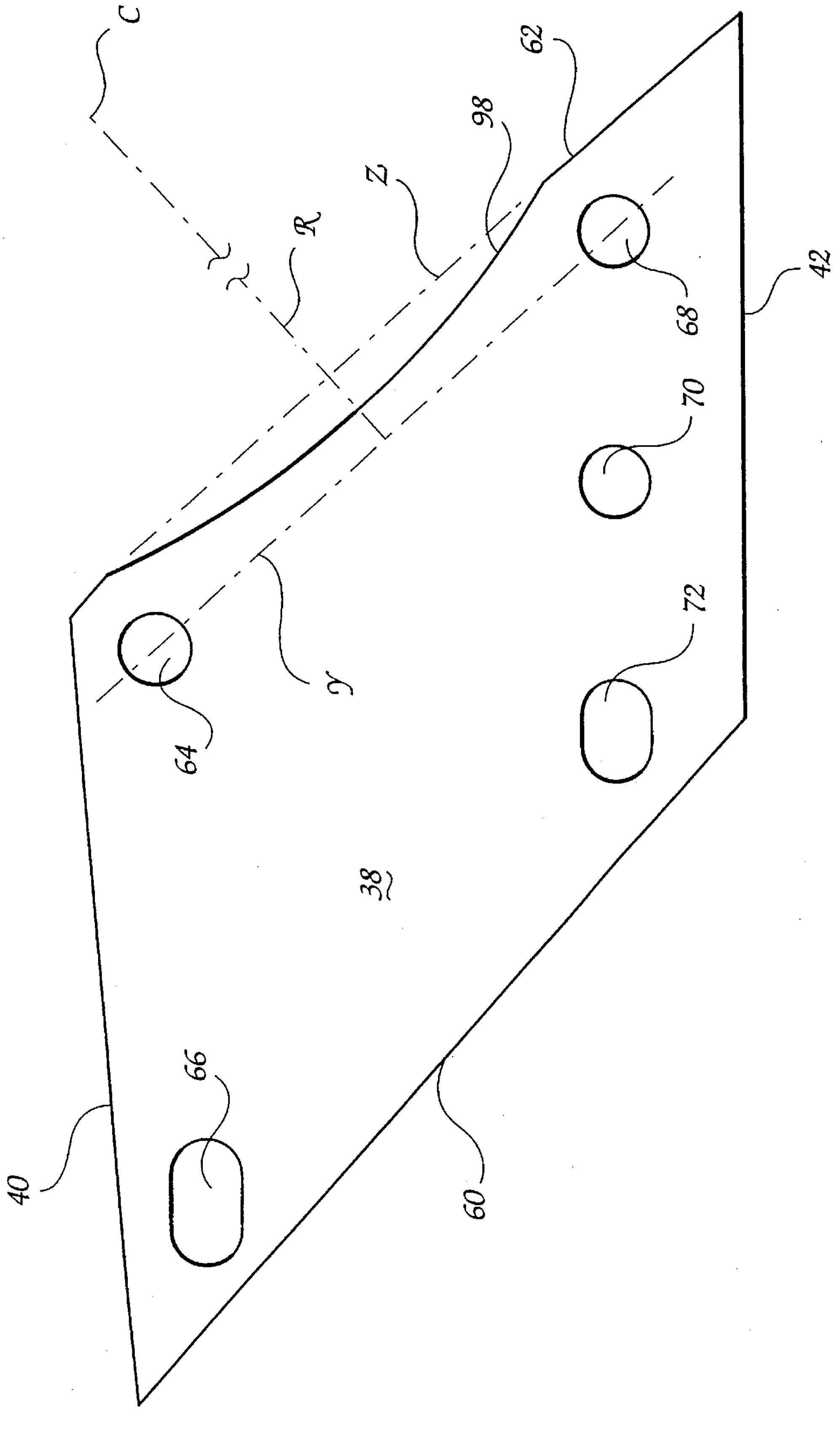
FIG. 5 is a plan view of a typical leaf utilized in the seal assembly of FIGS. 1–4.

Each leaf 38 is formed from a suitably resilient flat stock material, such as flat spring steel stock, and as depicted in FIG. 5, is preferably configured of a generally rhombic configuration having two opposed lateral side edges 60,62 extending angularly between opposite end edges defining the mounting and sealing ends 40,42 of the leaf. Each leaf 38 is preformed by permanently bending along its lengthwise extent into a curved configuration (see FIGS. 3 and 4), whereby the outer surface of each leaf 38 has a generally concave configuration in the longitudinal extent of the leaf. When collectively arranged in the annular sealing assembly 32, the side edge 62 of each leaf 38 is overlapped by the side edge 60 of the next adjacent leaf 38 in annular succession, the resiliency of the leaves 38 causing the respective side edges 62 to be biased into abutted sealing contact with the overlapping side edge 60 of the adjacent leaf. By virtue of the rhombic configuration of the leaves 38, each leaf 38 extends obliquely from its mounting end 40 to its sealing end 42 relative to an intersecting axial plane through the rotational axis of the drum 12 whereby the sealing end 42 of each leaf 38 is displaced circumferentially a relatively substantial distance from the respective leaf's mounting end 40.

The respective leaves 38 are assembled in such overlapping relationship by means of bolt holes formed respectively at the mounting and sealing ends 40,42 of each leaf 38. Specifically, the mounting end 40 of each respective leaf 38 is formed with a circular opening 64 adjacent the sealing edge 62 and a laterally elongated slot 66 adjacent the overlapping side edge 60, while the sealing end 42 of each leaf 38 is similarly formed with a circular opening 68 adjacent the sealing edge 62 and a laterally elongated slot 72 adjacent the overlapping side edge 60 along with another circular opening 70 disposed generally midway therebetween. In assembled relationship, each leaf 38 overlaps with the adjacent leaf 38 to a sufficient extent to dispose the respective slots 66,72 of each leaf in overlapping alignment respectively to the circular openings 64,68 of the next adjacent leaf. The thusly overlapped leaves 38 are affixed to the annular mounting bracket 36 by bolts 74 extended through the respective aligned openings 64,66 and through correspondingly spaced openings formed circumferentially about the bracket 36. Similarly, bolts 76 extend through the aligned openings and slots 68,72 of the overlapping leaves 38 as well as through the openings 70, and through the respective wear liners 44 to fasten the sealing ends 42 of the leaves 38 together and to support the respective wear liners 44 in a collective annular arrangement. Some of the bolts 76 may have eyes (not shown) to receive a cable (also not shown) extending about the full circumference of the seal assembly 32 to assist in holding the sealing ends 42 of the leaves 38 and the associated wear liners 44 against the cylindrical surface of the wear ring 46.

As will thus be understood, the multiple individual wear liners 44 are supported by the overlapping arrangement of leaves 38 in an essentially end-to-end annular arrangement forming a substantially continuous ring of the wear liners 44 which encircles the cylindrical wear ring 46 in substantially continuously contact therewith. In this manner, the overlapping leaves 38 in conjunction with the end-to-end arrangement of the wear liners 44 serves to form an effective seal between the wear ring 46 and the hood 30, while at the same time the face-abutting annular plates 56,58 form a similarly effective seal between the wear ring 46 and the shell 24 of the drum 12. In ongoing operation of the kiln 10, the resilient flexure of the individual leaves 38 together with the resilient biasing of the wear ring support devices 48 by their individual springs 54 provides the entire overall annular sealing assembly 32 with sufficient resiliency to deflect in response to the known tendency of the kiln drum 12 to become eccentric or out-of-round, to wobble, or to otherwise deflect radially, without breaching the effectiveness of the sealing contact between the wear liners 44 and the wear ring 46 or between the abutting annular plates 56,58, thereby providing an improved and more effective seal and, hence, more efficient and economical operation of the kiln in comparison to the use of known prior art kiln seals.

In the normal ongoing reaction of the sealing assembly 32 to deflections, eccentricity and other movements of the drum 12, the individual leaves 38 will necessarily move relative to one another. To best facilitate such movement, the present invention provides a novel means of bolted connection between the overlapping edges 60,62 of the respective leaves 38, as best seen in FIG. 4. Specifically, an annular spacer sleeve 78 is assembled with each bolt 74 and 76 to prevent the respective bolts from overtightening the lapping edges 60,62 of the leaves 38, thereby permitting the overlapping extents of adjacent leaves 38 to move laterally relative to one another to the extent of each elongated slot 66,72 and, in turn, protecting the individual bolts 74,76 from potentially being sheared and/or damaging the bolt threads as a result of movements of the leaves 38. As seen in FIG. 4, each spacer sleeve 78 for each bolt 74 retaining the mounting end 40 of the leaves 38 resides in the opening through the mounting bracket 36 between the head portion of the bolt 74 and an assembly of an annular retainer 80, a washer 82 and a nut 84 secured to the opposite threaded end of the bolt 74 at the outward side of the respective leaf 38. Similarly, the spacer sleeve 78 about each bolt 76 resides within the respective bolt opening 44' through a wear liner 44 so as to hold the head portion of the bolt 76 spaced from a washer 86, a securing nut 88, and a jam nut 90 threadedly secured to the opposite end of the bolt 76 at the outward side of the respective leaf 38. The controlled degree of relative lateral movement between the leaves 38 accomplished by the use of such spacer sleeves 78 also permits the leaves 38 to gradually deflect radially inwardly toward the wear ring 46, under the natural resilient flexure of the leaves 38 as supplemented by the aforementioned cable arrangement, as the wear liners 44 gradually become thinner as a result of progressive wear over the course of kiln operation, thereby serving to maintain a substantially effective seal despite wearing of the liners 44.

Figure 6:
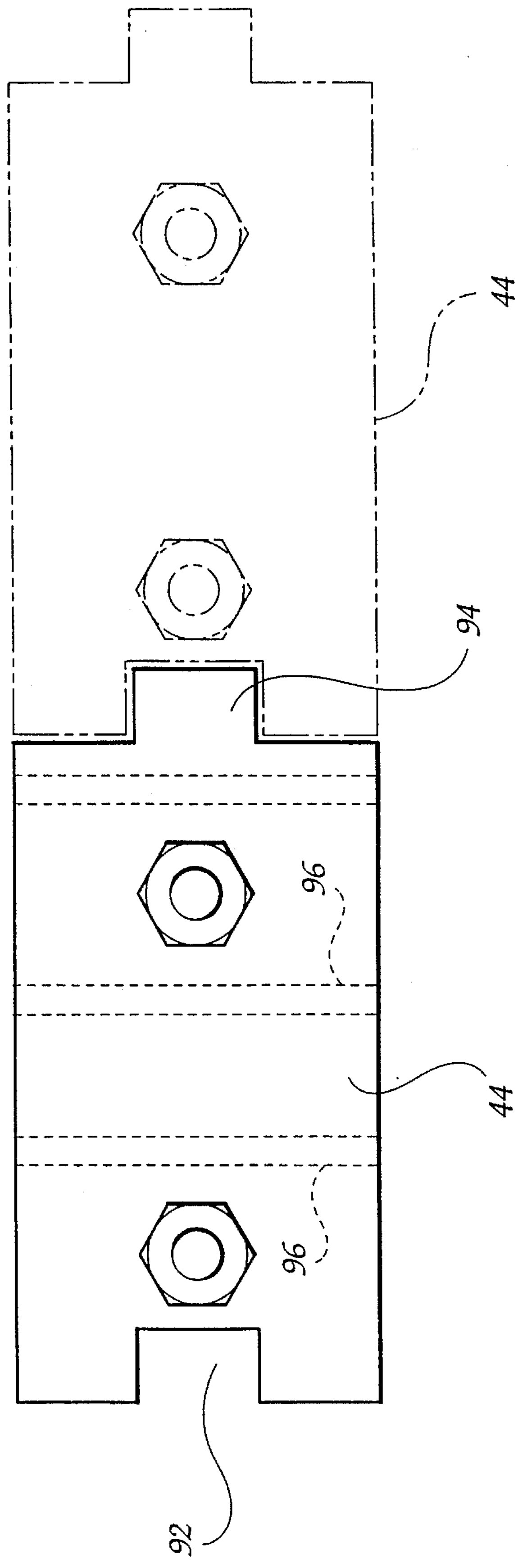
FIG. 6 is a plan view of a typical wear liner used in the seal assembly of FIGS. 1–4.

The wear liners 44 should preferably be formed of a suitable material which will withstand the relatively high temperatures prevailing within the kiln 10 and will not become distorted in basic shape over the course of operation so as to maintain continuous effective sealing contact with the wear ring 46, but without creating a significant level of friction or other tendency to scar or deface the outer surface of the wear ring 46. For this purpose, the wear liners 44 are preferably formed of a sintered, heat resistant metallic brake material wherein graphite granules are used in place of the normal frictional grit material so as to provide lubrication rather than excessive friction. Each wear liner 44 is also preferably formed into a slightly arcuate configuration so as to conform to the cylindrical outer surface of the wear ring 46. As best seen in FIG. 6, each wear liner 44 may also preferably be formed with a recess 92 in one end and a corresponding projection tab 94 extending from the opposite end so that the respective wear liners 44, when arranged end-to-end, overlap with one another by extension of each wear liner's projection tab 94 into the recess 92 of the next adjacent wear liner 44. In this manner, a slight spacing may be left between the adjacent ends of the wear liners 44 without risking breach of their sealing relationship with the wear ring 46, thereby permitting lateral movement of the wear liners 44 along with the leaves 38 while maintaining an effective seal by virtue of the overlapping projections 94.

Each wear liner 44 is also provided with a series of axial slots 96 formed transversely in the outward face of the wear liner 44 which contacts the wear ring 46. As will be understood, because the wear liners 44 are maintained in direct contact with the wear ring 46, the liners 44 tend to partially insulate the leaves 38 from the heat generated within the kiln 10 and, in turn, the wear liners 44 tend to heat and expand more rapidly than the leaves 38. The axial slots 96 thusly serve to allow the wear liners 44 to expand without tending to flatten or straighten out of their desired arcuate configuration, thereby to maintain essentially continuous contact between the outer surfaces of the wear liners 44 and the wear ring 46. The axial slots 96 tend to close as the wear liners 44 expand and, in any event, are sufficiently small that air leakage through the slots 96 does not significantly affect the efficiency and economy of kiln operation.

With reference to FIG. 5, it will be seen that the sealing edge 62 of each leaf 38 is formed with an arcuate recess 98 which serves to reduce the resistance of the individual leaf 38 to bending flexure which better facilitates installation of the leaves in their overlapping relationship and serves to better ensure sealing contact between the sealing edge 62 of each leaf 38 and the overlapping edge 60 of the next adjacent leaf 38. According to the present invention, the radius on which the arcuate recess 98 is formed should be a function of the length of the leaves 38, more particularly the distance between the bolt holes 64,68 at the sealing edge 62 of the leaf 38. Specifically, the optimal radius for any given configuration of leaf 38 is preferably calculated by solving the following equation:

$$R = \frac{t}{\mathrm{SIN}\left(180 - 2\left(\mathrm{arcTAN}\,\frac{t}{p}\right)\right)}$$

wherein t represents one-half the dimension or distance between the bolt holes 64,68, and p represents the maximum distance or dimension to which the arcuate recess extends laterally into the leaf 38 at the midpoint between the bolt holes 64,68. The bolt holes 64,68 should be spaced an equal distance from an imaginary line z extending between the corner points at which the sealing edge 62 intersects respectively with the opposite edges of the leaf 38 along its mounting and sealing ends 40,42, whereby a line Y intersecting the centers of the two bolt holes 64,68 is parallel to the imaginary line Z. In turn, the radius R forming the arcuate recess 98 should be disposed along a line A which extends perpendicularly to the lines Y,Z and intersects the line Y precisely midway between the centers of the bolt holes 64,68.

Of course, as those persons skilled in the art will recognize and understand, while the foregoing calculation is believed to achieve the optimal location and configuration for the arcuate recess 98 in relation to the configuration and size of any given leaf 38, it is believed that essentially any form of recess, arcuate or otherwise, in the sealing edge 62 of each leaf 38, will contribute to the desired purpose of reducing bending resistance at the sealing edge 62 of the leaf 38 and, in turn, contribute to improved maintenance of sealing engagement between the overlapping leaf edges 60,62 in the present annular sealing assembly 32.

In summary, the various above-described features of the present invention uniquely cooperate to provide a significantly improved seal for rotary kilns and other like rotary drums, particularly in high temperature environments. The provision of the wear ring 46 in the present annular sealing assembly 32 eliminates direct contact of the sealing assembly 32 with the shell 24 of the kiln drum 12 so as to essentially eliminate altogether any risk of damage to the drum itself. Hence, in the occurrence of any extreme situation during operation of the kiln 10, any damage occurring would essentially only affect the leaves 38, the wear liners 44, and/or the wear ring 46, which will be understood to be substantially easier and less expensive to repair or replace than the drum 12.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A rotary seal assembly for sealing a large, high temperature rotary drum to a stationary hood, said drum having a substantially circular cylindrical surface near one open end thereof substantially coaxial with its axis of rotation, and said hood being open to the interior of said drum through said open end, said seal assembly comprising:

a series of resilient overlapping metal leaves disposed to collectively encircle said cylindrical surface of said drum, each said leaf having a mounting end and a sealing end, said mounting end being affixed to said stationary hood and said sealing end extending toward said cylindrical surface, each said leaf having a sealing edge between said mounting and sealing ends, said sealing edge being disposed in lapping relation to an adjacent leaf, and each said leaf further having an overlapping edge between said mounting and sealing ends, said overlapping edge being located opposite said sealing edge;

a wear liner disposed on each said leaf at its sealing end;

a plurality of support devices fixed to said cylindrical surface;

a wear ring mounted annularly about said cylindrical surface to said support devices and having an outer surface for sealing engagement by said wear liners;

said support devices having resilient means for yielding movement in response to radial movement of said cylindrical surface; and inner and outer annular plates attached respectively to said cylindrical surface and to said wear ring and extending therefrom toward one another into overlapping abutment to seal the annular area between said cylindrical surface and said wear ring.

2. The rotary seal assembly according to claim 1 wherein each said wear liner has an inner surface for engagement with said wear ring and a slot formed in said inner engagement surface axially relative to said axis of rotation of said drum to permit thermal expansion of said inner engagement surface.

3. The rotary seal assembly according to claim 1 and wherein each said leaf is flexed resiliently between its said mounting and sealing ends for continuously urging the respective said wear liner against said wear ring.

4. The rotary seal assembly according to claim 1 and further comprising securing and spacing means for securing each said leaf at its overlapping edge to said hood and to said wear liner and further to the sealing edge of an adjacent leaf, said securing and spacing means allowing each said leaf to move circumferentially at its overlapping edge relative to said hood and said wear liner.

5. The rotary seal assembly according to claim 1 wherein said sealing edge of each said leaf includes an arcuate portion recessed in said leaf from the remaining portion of said sealing edge for reducing the resistance of said leaf to bending flexure while allowing each said leaf to maintain a sealing engagement with each said adjacent overlapping leaf at said sealing edge.

6. The rotary seal assembly according to claim 1 wherein said drum has an axis of rotation defining axial planes, each said leaf having an inner and outer surface, said outer surface being concave in a said axial plane, each said leaf extending from said mounting end to said sealing end obliquely relative to a said axial plane therethrough so that said sealing end is displaced circumferentially a substantial distance relative to said mounting end, and said sealing edge between said mounting and sealing ends of each said leaf extending obliquely of a said axial plane.

7. The rotary seal assembly according to claim 1 wherein each said wear liner has an inner surface for engaging said wear ring, said inner surface being shaped to conform with the outer surface of the said wear ring in sealing engagement.

8. The rotary seal assembly according to claim 1 wherein each said support device comprises a tubular element affixed to one of the said cylindrical surface of said drum and said wear ring, a guide pin affixed to the other of said cylindrical surface and said wear ring and received slidingly in said tubular element, and means for urging said guide pin and said tubular element away from one another.

9. The rotary seal assembly according to claim 1 wherein said wear ring is a cylindrical ring.

10. The rotary seal assembly according to claim 1 wherein said inner annular plate extends radially outward from said cylindrical surface of said drum and said outer annular plate extends radially inward from said wear ring in parallel face-abutting relation with one another.

11. A rotary seal assembly for sealing a large, high temperature rotary drum to a stationary hood, said drum having a substantially circular cylindrical surface near one open end thereof substantially coaxial with its axis of rotation, and said hood being open to the interior of said drum through said open end, said seal assembly comprising:

a wear ring disposed annularly about said cylindrical surface of said drum;

first sealing means extending between said hood and said wear ring for forming a seal therebetween, said first sealing means being resiliently biased for yielding movement in response to radial movement of said wear ring; and second sealing means extending between said cylindrical surface of said drum and said wear ring to seal the annular area therebetween, said second sealing means being resiliently biased for yielding movement in response to radial movement of said cylindrical surface.

* * * * *